United States Patent
Bechstein et al.

(10) Patent No.: US 11,592,946 B1
(45) Date of Patent: Feb. 28, 2023

(54) CAPACITIVE GAP FORCE SENSOR WITH MULTI-LAYER FILL

(71) Applicant: Apple Inc., Cupertino, CA (US)

(72) Inventors: Daniel J. Bechstein, Mountain View, CA (US); Nahid Harjee, Sunnyvale, CA (US); Travis N. Owens, Lakeway, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/481,122

(22) Filed: Sep. 21, 2021

(51) Int. Cl.
*G06F 3/044* (2006.01)
*G06F 3/041* (2006.01)

(52) U.S. Cl.
CPC .......... *G06F 3/0445* (2019.05); *G06F 3/0412* (2013.01); *G06F 2203/04103* (2013.01); *G06F 2203/04105* (2013.01)

(58) Field of Classification Search
CPC ......... G06F 3/0445; G06F 2203/04105; G06F 3/0447; G06F 3/041–047; G06F 1/16–1698; G06F 3/0414; G06F 3/03547; G01L 9/0072; G01L 1/142; G01L 1/20; G01L 1/18; G01L 1/205
See application file for complete search history.

(56) References Cited

U.S. PATENT DOCUMENTS

| | | |
|---|---|---|
| 3,783,394 A | 1/1974 | Avery |
| 4,310,840 A | 1/1982 | Williams et al. |
| 4,539,554 A | 9/1985 | Jarvis et al. |
| 4,745,565 A | 5/1988 | Garwin |
| 5,008,497 A | 4/1991 | Asher |
| 5,050,034 A | 9/1991 | Hegner |
| 5,241,308 A | 8/1993 | Young |
| 5,543,588 A | 8/1996 | Bisset et al. |
| 5,625,292 A | 4/1997 | Crook |
| 6,002,389 A | 12/1999 | Kasser |
| 6,278,888 B1 | 8/2001 | Hayes, Jr. et al. |
| 6,501,529 B1 | 12/2002 | Kurihara |
| 6,545,495 B2 | 4/2003 | Warmack et al. |
| 6,567,102 B2 | 5/2003 | Kung |
| 6,664,489 B2 | 12/2003 | Kleinhans et al. |
| 6,723,937 B2 | 4/2004 | Englemann et al. |
| 6,809,280 B2 | 10/2004 | Divigalpitiya |
| 7,006,078 B2 | 2/2006 | Kim |
| 7,106,311 B2 | 9/2006 | Tsang |

(Continued)

FOREIGN PATENT DOCUMENTS

| | | |
|---|---|---|
| EP | 2357547 | 8/2011 |
| WO | WO 20/079995 | 4/2020 |

*Primary Examiner* — Sanjiv D. Patel
(74) *Attorney, Agent, or Firm* — Brownstein Hyatt Farber Schreck, LLP

(57) ABSTRACT

A capacitive gap force sensor includes a first electrode, a second electrode spaced apart from the first electrode, a first layer of dielectric material positioned between the first electrode and the second electrode, and a second layer of conductive material positioned between the first layer and the second electrode. The first layer has a first compression resistance less than a second compression resistance of the second layer. An effective capacitive sensing gap is defined between the first electrode and the second layer. The first layer is configured to compress or deform and alter the effective capacitive sensing gap when a force is received at the first electrode or the second electrode.

21 Claims, 9 Drawing Sheets

(56) References Cited

U.S. PATENT DOCUMENTS

| | | |
|---|---|---|
| 7,109,978 B2 | 9/2006 | Gillespie et al. |
| 7,154,481 B2 | 12/2006 | Cross et al. |
| 7,158,122 B2 | 1/2007 | Roberts |
| 7,216,048 B2 | 5/2007 | Wang et al. |
| 7,242,395 B2 | 7/2007 | Kurashima et al. |
| 7,378,856 B2 | 5/2008 | Peine |
| 7,479,790 B2 | 1/2009 | Choi |
| 7,522,019 B2 | 4/2009 | Bhave et al. |
| 7,567,240 B2 | 7/2009 | Peterson et al. |
| 7,595,788 B2 | 9/2009 | Son |
| 7,663,612 B2 | 2/2010 | Bladt |
| 7,681,432 B2 | 3/2010 | Hay et al. |
| 7,784,366 B2 | 8/2010 | Daverman et al. |
| 7,816,838 B2 | 10/2010 | Leskinen et al. |
| 7,825,907 B2 | 11/2010 | Choo et al. |
| 7,884,315 B2 | 2/2011 | Andre et al. |
| 8,018,568 B2 | 9/2011 | Allemand et al. |
| 8,120,588 B2 | 2/2012 | Klinghult |
| 8,248,081 B2 | 8/2012 | Maharyta et al. |
| 8,261,621 B2 | 9/2012 | Parikh |
| 8,266,971 B1 | 9/2012 | Jones |
| 8,294,226 B2 | 10/2012 | Pomposo Alonso et al. |
| 8,390,481 B2 | 3/2013 | Pance et al. |
| 8,576,182 B2 | 11/2013 | Hristov |
| 8,866,796 B2 | 10/2014 | Shepelev et al. |
| 8,887,584 B2 | 11/2014 | Tohmyoh et al. |
| 8,913,021 B2 | 12/2014 | Elias et al. |
| 8,996,166 B2 | 3/2015 | Jenkinson |
| 9,001,045 B2 | 4/2015 | Laitinen et al. |
| 9,013,195 B2 | 4/2015 | Kremin |
| 9,019,209 B2 | 4/2015 | Geaghan |
| 9,024,907 B2 | 5/2015 | Bolender |
| 9,041,659 B2 | 5/2015 | Perski et al. |
| 9,057,653 B2 | 6/2015 | Schediwy et al. |
| 9,069,426 B2 | 6/2015 | Pance et al. |
| 9,086,768 B2 | 7/2015 | Elias et al. |
| 9,201,547 B2 | 12/2015 | Elias et al. |
| 9,268,431 B2 | 2/2016 | King et al. |
| 9,323,353 B1 | 4/2016 | Sivertsen |
| 9,329,719 B2 | 5/2016 | Mölne et al. |
| 9,377,907 B2 | 6/2016 | Shahparnia |
| 9,459,746 B2 | 10/2016 | Rosenberg et al. |
| 9,535,549 B2 | 1/2017 | Pyoun |
| 9,557,857 B2 | 1/2017 | Schediwy |
| 9,921,679 B2 | 3/2018 | Son et al. |
| 9,990,087 B2 | 6/2018 | Richards |
| 10,068,728 B2 | 9/2018 | Huska et al. |
| 10,242,810 B2 | 3/2019 | Mahajan et al. |
| 10,503,329 B2 | 12/2019 | Sleeman et al. |
| 10,605,628 B2 | 3/2020 | Sleeman et al. |
| 10,644,383 B2 | 5/2020 | Lima et al. |
| 10,921,943 B2 | 2/2021 | Bechstein et al. |
| 10,949,040 B2 | 3/2021 | Lee et al. |
| 2005/0024065 A1 | 2/2005 | Umeda et al. |
| 2007/0074913 A1 | 4/2007 | Geaghan et al. |
| 2008/0068229 A1 | 3/2008 | Chuang |
| 2009/0002199 A1 | 1/2009 | Lainonen et al. |
| 2010/0148813 A1 | 6/2010 | Erickson |
| 2010/0207905 A1 | 8/2010 | Chang et al. |
| 2011/0018558 A1 | 1/2011 | Saito et al. |
| 2011/0084932 A1 | 4/2011 | Simmons et al. |
| 2011/0090174 A1 | 4/2011 | Lin |
| 2011/0163991 A1 | 7/2011 | Tout |
| 2011/0235156 A1 | 9/2011 | Kothari et al. |
| 2012/0280934 A1 | 11/2012 | Ha et al. |
| 2012/0319987 A1 | 12/2012 | Woo |
| 2013/0016060 A1 | 1/2013 | Pereverzev et al. |
| 2013/0018489 A1 | 1/2013 | Grunthaner et al. |
| 2013/0278539 A1 | 10/2013 | Valentine et al. |
| 2013/0307810 A1 | 11/2013 | Verweg et al. |
| 2013/0342468 A1 | 12/2013 | Hekstra |
| 2014/0104184 A1 | 4/2014 | Meador et al. |
| 2014/0267957 A1* | 9/2014 | Iwamoto .............. G06F 3/041 349/12 |
| 2015/0070037 A1 | 3/2015 | Pragada et al. |
| 2015/0091858 A1* | 4/2015 | Rosenberg .......... G06F 3/04144 345/174 |
| 2018/0095581 A1* | 4/2018 | Hwang ................ H01L 27/323 |
| 2019/0189899 A1 | 6/2019 | Sieber et al. |
| 2020/0174623 A1* | 6/2020 | Lee .................... H01L 27/3234 |
| 2021/0124460 A1 | 4/2021 | Bechstein et al. |
| 2021/0311534 A1* | 10/2021 | Nakanishi ............ G01L 1/146 |

* cited by examiner

CAPACITIVE GAP FORCE SENSOR WITH MULTI-LAYER FILL

FIELD

The described embodiments relate to sensors for determining the presence of a force, or an amount of force, on a force input surface. More particularly, the described embodiments relate to capacitive gap force sensors.

BACKGROUND

Sensors are included in many of today's electronic devices, including electronic devices such as smartphones, computers (e.g., tablet computers or laptop computers), wearable electronic devices (e.g., electronic watches, smart watches, or health or fitness monitors), game controllers, navigation systems (e.g., vehicle navigation systems or robot navigation systems), earbuds, headphones, and so on. Sensors may variously sense the presence of objects, forces applied by objects, distances to objects, proximities of objects, movements of objects (e.g., whether objects are moving, or the speed, acceleration, or direction of movement of objects), compositions of objects, and so on. One useful type of sensor is the capacitive gap force sensor.

Given the wide range of sensor applications, any new development in the configuration or operation of a sensor can be useful. New developments that may be particularly useful are developments that reduce the cost, size, complexity, part count, or manufacture time of a sensor, or developments that improve the sensitivity or speed of sensor operation.

SUMMARY

Embodiments of the systems, devices, methods, and apparatus described in the present disclosure are directed to capacitive gap force sensors.

In a first aspect, the present disclosure describes an electronic device. The electronic device may include a capacitive gap force sensor and a housing. The capacitive gap force sensor may include a first electrode, a second electrode spaced apart from the first electrode, a first layer of dielectric material positioned between the first electrode and the second electrode, and a second layer of conductive material positioned between the first layer and the second electrode. The housing may have a force input surface. The first layer may have a first compression resistance that is less than a second compression resistance of the second layer. An effective capacitive sensing gap may be defined between the first electrode and the second layer. The capacitive gap force sensor may be positioned near or against an interior surface of the housing, under the force input surface. The first layer may be configured to compress or deform and alter the effective capacitive sensing gap when a force is received on the force input surface.

In a second aspect, the present disclosure describes a capacitive gap force sensor. The capacitive gap force sensor may include a first electrode, a second electrode spaced apart from the first electrode, a first layer of dielectric material positioned between the first electrode and the second electrode, and a second layer of conductive material positioned between the first layer and the second electrode. The first layer may have a first compression resistance that is less than a second compression resistance of the second layer. An effective capacitive sensing gap may be defined between the first electrode and the second layer. The first layer may be configured to compress or deform and alter the effective capacitive sensing gap when a force is received at the first electrode or the second electrode.

In a third aspect, the present disclosure describes a method of constructing a capacitive gap force sensor. The method may include constructing a stack of materials. Constructing the stack of materials may include attaching a first electrode to a first surface of a first layer of dielectric material, attaching a second electrode to a first surface of a second layer of conductive material, and attaching a second surface of the first layer to a second surface of the second layer. The second surface of the first layer may be opposite the first surface of the first layer, and the second surface of the second layer may be opposite the first surface of the second layer. The stack of materials may define an effective capacitive sensing gap between the first electrode and the second layer of conductive material.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
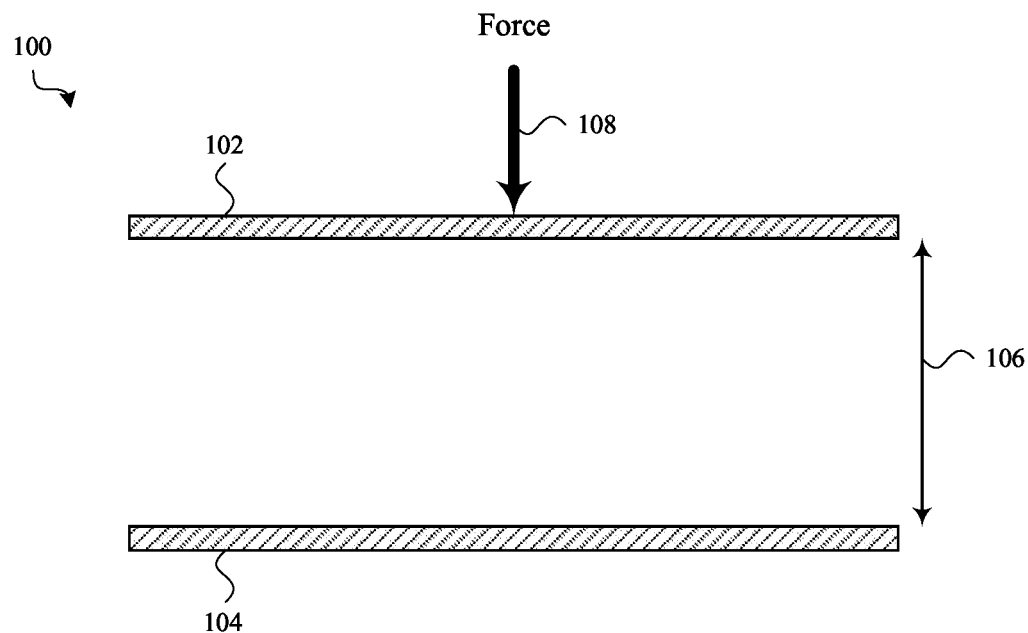
FIG. 1 shows an example of a capacitive gap force sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Capacitive gap force sensing uses a capacitor to sense a presence of a force or an amount of force. In particular, when an amount of force is applied to a capacitive gap force sensor, the force changes a spacing between the capacitor's electrodes, thus changing the capacitor's capacitance. The capacitance, or change in capacitance, can be sensed and correlated to an amount of force.

Described herein is a capacitive gap force sensor having a multi-layer fill. The multi-layer fill includes a layer of conductive material that decreases the effective capacitive sensing gap between the sensor's electrodes. The multi-layer fill also includes a layer of dielectric material, which increases the dielectric constant of the effective capacitive sensing gap, thus increasing the sensor's capacitance, force sensitivity and, ultimately, the force signal that can be obtained from the sensor.

In some cases, a first electrode, a first layer of dielectric material, a second layer of conductive material, and a second electrode may be assembled to form a capacitive gap sensor having a multi-layer fill. During and after assembly, the second layer may have a compression resistance that is less than the compression resistance of the first layer. This enables the conductive material to compress more than the dielectric material (and preferably much more) when the sensor is positioned in a particular application. After the sensor is positioned, the conductive material can be structurally modified through heating, exposure to light, or other means. The structural modification of the conductive material sets the nominal extent of the conductive material (defining a fixed capacitive sensing gap between the first electrode and the layer of conductive material), and also increases its compression resistance so that the compression resistance of the conductive material is greater than the compression resistance of the dielectric material. Thus, when used to sense an applied force, the dielectric material compresses more than the conductive material (and preferably much more).

Providing the layer of conductive material in an initial state that allows it to compresses much more than the dielectric material 1) limits the amount of compression that occurs within the dielectric material during install, and 2) substantially confines the compression that occurs during install to the layer of conductive material. As a result, like sensors that are installed in spaces of differing size are likely to have structurally modified conductive layers having different thicknesses, but have effective capacitive sensing gaps that are the same (or very similar). Like sensors that are installed in different locations, or used in different applications, are therefore likely to produce both higher and more uniform signals (i.e., more uniform signals or responses from sensor to sensor, or device to device, given equivalent applications of force).

The above and other embodiments and techniques are described with reference to FIGS. 1-9. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of defining relative positions of various structures, and not absolute positions. For example, a first structure described as being "above" a second structure and "below" a third structure is also "between" the second and third structures, and would be "above" the third structure and "below" the second structure if the stack of structures were to be flipped. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

FIG. 1 shows an example of a capacitive gap force sensor 100. The sensor 100 includes a first electrode 102 and a second electrode 104 (e.g., metal plates, conductive traces, or other conductive elements). The second electrode 104 is spaced apart from the first electrode 102 by a capacitive sensing gap 106. The electrodes 102, 104 may be attached to various structures that preserve the capacitive sensing gap 106 absent a force 108 applied to the sensor 100. In some cases, the electrodes 102, 104 may be attached to different surfaces of a capacitive sensing module, or to different components that have a fixed relationship absent a force 108 applied to the sensor 100. The capacitive sensing gap 106 may be filled with air or a dielectric material.

When a force 108 is applied to the first electrode 102, or to a surface (e.g., a surface of a housing) that the first electrode 102 is placed near or adjacent, the first electrode 102 may deform or move toward the second electrode 104, thereby compressing, deforming, and/or altering (e.g., changing the profile of) the capacitive sensing gap 106 and, as a result, changing a capacitance of the sensor 100. Alternatively, the second electrode 104 may be positioned near or adjacent a force input surface, and a force may be applied to the second electrode 104; or the capacitive gap force sensor 100 may be positioned between a pair of force input surfaces and a force may be applied to one or both of the first and second electrodes 102, 104 via one or both of the force input surfaces (e.g., with a pinching-type application of force). A capacitive force sensing circuit coupled to one of the electrodes 102, 104 (in the case of a self-capacitance sensor) or both of the electrodes 102, 104 (in the case of a mutual capacitance sensor), and an analog-to-digital converter (ADC) and processor may be used to convert the capacitance (or change in capacitance) to an amount of force (or to a change in an amount of force). The capacitive force sensing circuit (in some cases in combination with the ADC and processor) may also be used to detect a presence of a force on the first electrode 102 (i.e., in a binary detect/no detect mode of operation).

Figure 2A:
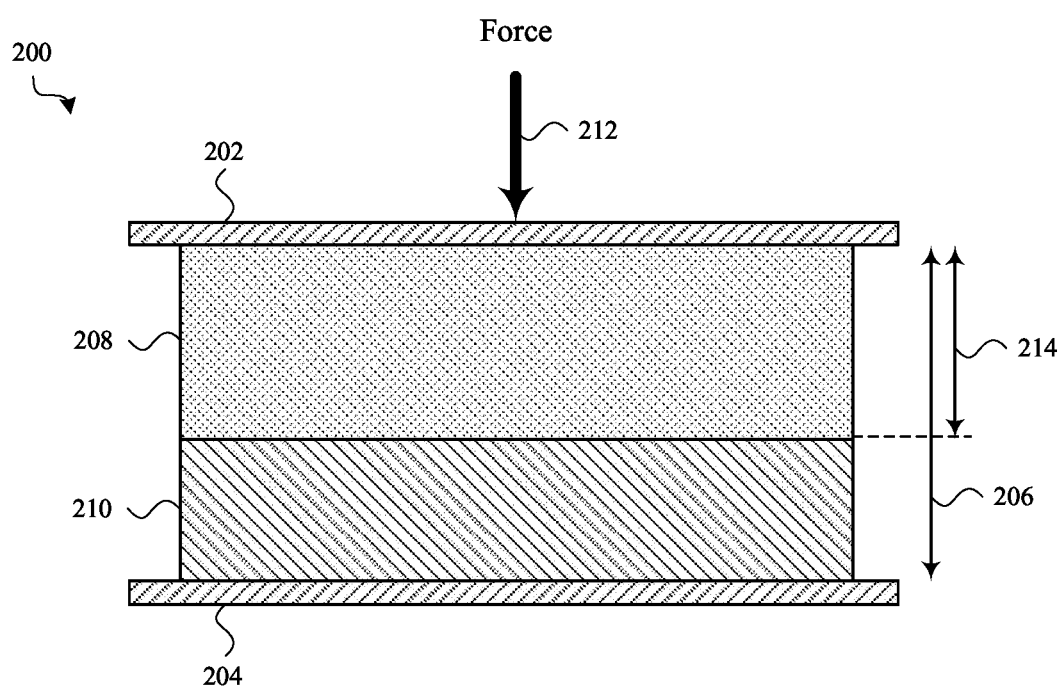
FIGS. 2A-2C show various examples of a capacitive gap force sensor having a multi-layer fill.
Figure 2B:
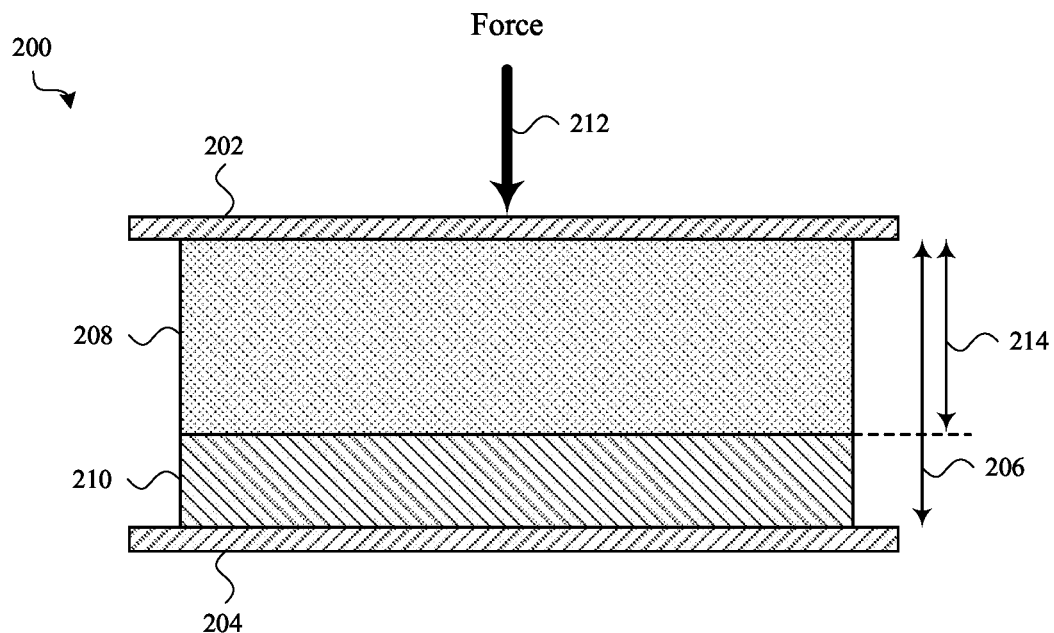
Figure 2C:
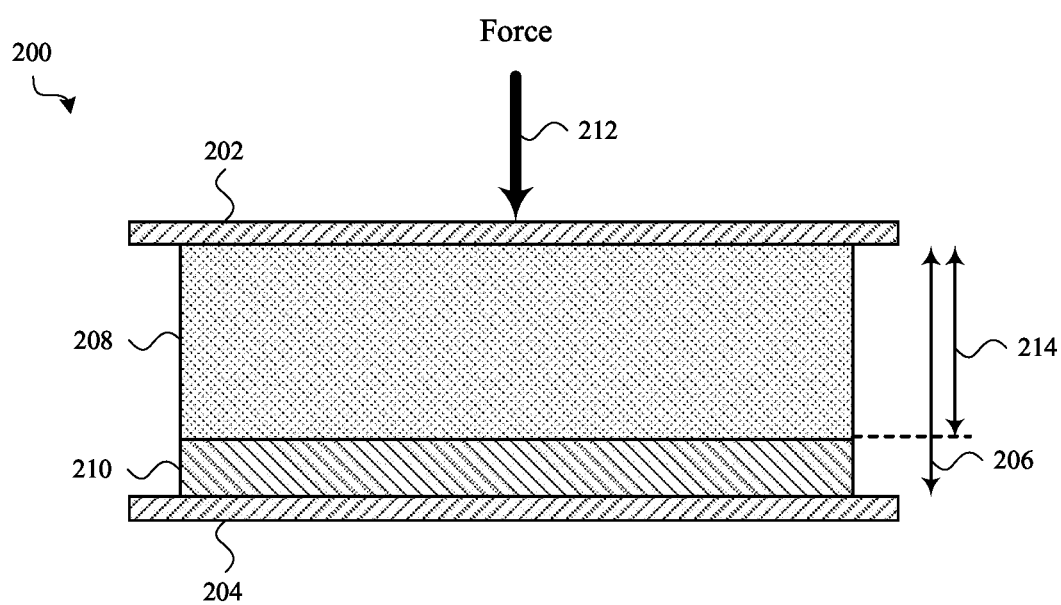

FIGS. 2A-2C show various examples of a capacitive gap force sensor 200 having a multi-layer fill. As shown in FIG. 2A, the sensor 200 includes a first electrode 202 and a second electrode 204. The second electrode 204 is spaced apart from the first electrode 202 by a space 206. The space 206 may be filled with a multi-layer fill including a first layer 208 of a dielectric material and a second layer 210 of a conductive material. The first layer 208 may be positioned between the first electrode 202 and the second electrode 204, and the second layer 210 may be positioned between the first layer 208 and the second electrode 204.

The first layer 208 may have a first compression resistance that is less than a second compression resistance of the second layer 210. In other words, the first layer 208 may be softer than the second layer 210. In some embodiments, the compression resistance of the first layer 208 may be much less than (e.g., an order of magnitude or more less than) the compression resistance of the second layer 210. When the compression resistance of the first layer 208 is much less than the compression resistance of the second layer 210 (and likewise, when the compression resistance of the second layer 210 is much greater than the compression resistance of the first layer 208), an effective capacitive sensing gap 214 that is smaller than the space 206 may be defined between the first electrode 202 and the second layer 210. A smaller capacitive sensing gap provides the sensor 200 with a greater sensitivity for detecting forces applied to the first electrode 202 (e.g., as compared to the sensor described with reference to FIG. 1, and assuming that the electrodes of each sensor are equally spaced).

In some cases, the first and second layers 208, 210 may be or include polymers, such as polymer foams. In the case of polymer foams, each of the first and second layers 208, 210 may be or include an open cell polymer foam and/or a closed cell polymer foam. In some cases, the first or second layer 208, 210 may be or include other types of foams, such as other types of open and/or closed cell polymer foams. In some cases, each of the first and/or second layer 208, 210 may be a hydrophobic material. When both of the layers 208, 210 are hydrophobic, capacitive sensing may be less susceptible to variation due to moisture. In some cases, the dielectric material may have a dielectric constant of about 2-4. In some cases, the dielectric material may have a dielectric constant of 3 or about 3 (e.g., 3±10%). One or both of the first and second layers 208, 210 may in some cases include a composite material (i.e., a material having two or more constituent materials).

In some embodiments, the second layer 210 may be or include a foam (e.g., a polymer foam) that is at least partially coated with a metal. For example, the second layer 210 may be or include an electroplated polyurethane. In some embodiments, the second layer 210 may be or include a foam that includes metal or other conductive particles embedded in a polymer matrix. For example, the second layer 210 may be or include a porous first polymer having a conductive second polymer embedded in its pores.

In some cases, the first and second layers 208, 210 may be part of a multi-layer fill that spans an entirety of the space 206 between the first and second electrodes 202, 204. In some embodiments, the multi-layer fill may include other layers, such as an adhesive that attaches the first layer 208 to the second layer 210, an adhesive that attaches the first electrode 202 to the first layer 208, and/or an adhesive that attaches the second electrode 204 to the second layer 210.

In some cases, an air gap may be provided between the first and second layers 208, 210, or between the first electrode 202 and the first layer 208. If an air gap is provided, each of the first and second electrodes 202, 204 may need to be attached to a structure to preserve a fixed effective capacitive sensing gap 214 absent a force 212 on the first electrode 202.

When a force 212 is applied to the first electrode 202, or to a surface (e.g., a surface of a housing) that the first electrode 202 is placed near or adjacent, the first electrode 202 may deform or move toward the second electrode 204, thereby compressing, deforming, and/or altering (e.g., changing the profile of) the effective capacitive sensing gap 214 and, as a result, changing a capacitance of the sensor 200. Alternatively, the second electrode 204 may be positioned near or adjacent a force input surface, and a force may be applied to the second electrode 204; or the capacitive gap force sensor 200 may be positioned between a pair of force input surfaces and a force may be applied to one or both of the first and second electrodes 202, 204, via one or both of the force input surfaces (e.g., with a pinching-type application of force). A capacitive force sensing circuit coupled to one of the electrodes 202, 204 (in the case of a self-capacitance sensor) or both of the electrodes 202, 204 (in the case of a mutual capacitance sensor) may detect the capacitance (or change in capacitance), and an ADC and processor may be used to convert the capacitance (or change in capacitance) to an amount of force (or to a change in an amount of force). The capacitive force sensing circuit (in some cases in combination with the ADC and processor) may also be used to detect a presence of a force on the first electrode 202 (i.e., in a binary detect/no detect mode of operation).

The electrodes 202, 204 and layers 208, 210 may be assembled in various ways. For example, in some cases, it may be advantageous to attach the first layer 208 to the second layer 210 before attaching an electrode 202 or 204 to either the first layer 208 or the second layer 210. In some cases, it may be advantageous to attach the first electrode 202 to the first layer 208, or to attach the second electrode 204 to the second layer 210, before the first layer 208 is attached to the second layer 210.

Regardless of the order in which the electrodes 202, 204 and layers 208, 210 are assembled, it can be advantageous to assemble the electrodes 202, 204 and layers 208, 210 while the first layer 208 has a compression resistance that is greater than the compression resistance of the second layer 210. This is the opposite of the finished, usable sensor 200, in which the compression resistance of the first layer 208 is less than the compression resistance of the second layer 210.

Starting with a sensor 200 in which the first layer 208 has a greater compression resistance than the compression resistance of the second layer 210, the sensor 200 can be positioned in a space of arbitrary size. If the space is narrower than the height of the sensor (i.e., a dimension perpendicular to the first and second layers 208, 210 and extending from an exterior surface of the first electrode 202 to an exterior surface of the second electrode 204), the sensor 200 can be compressed to fit. The sensor 200 can be compressed before or during the positioning of the sensor 200 in the installation space. After the sensor 200 is compressed, or in cases where the sensor 200 does not need to be compressed, the second layer 210 may be structurally modified to transition the compression resistance of the second layer 210 to a compression resistance that is greater than the compression resistance of the first layer 208.

When the compression resistance of the second layer 210 starts out being less than the compression resistance of the first layer 208, the second layer 210 can compress to a greater degree than the first layer 208 and, in some embodiments, can absorb all, or substantially all (e.g., 90% or more), of the compression that occurs during assembly, installation, and so on. After the second layer 210 is structurally modified to increase its compression resistance, the first layer 208 can absorb all, or substantially all (e.g., 90% or more), of the compression caused by application of a force 212 to the first electrode 202.

The second layer 210 (i.e., the layer of conductive material) may be structurally modified in various ways, depending on the composition of the second layer 210. In some cases, the second layer 210 may be structurally modified by heating the second layer 210 (or otherwise thermally triggering a structural modification). In some cases, the second layer 210 may be structurally modified by exposing the second layer 210 to a predetermined wavelength or wavelengths of light (or other optically triggering a structural modification). In some cases, the second layer 210 may be structurally modified by exposure to oxygen or removal of oxygen. In some cases, the second layer 210 may be structurally modified by a chemical reaction (e.g., the second layer 210 may include an epoxy (e.g., a two-part epoxy) that is cured and hardened; or the second layer 210 may include a resin or other material that is in the form of a liquid or gel carried by a foam or other material, and the resin or other material may be cured and hardened).

FIGS. 2A, 2B, and 2C show the sensor 200 as it might exist, in different installation environments, after structurally modifying the second layer 210 to increase its compression resistance. FIG. 2A shows the sensor 200 with no compression of the second layer 210. FIG. 2B shows the sensor 200 after the second layer 210 has experienced moderate compression. FIG. 2C shows the sensor 200 after the second layer 210 has experienced more extreme compression. In all of these cases (FIGS. 2A-2C), the first layer 208 remains uncompressed or very mildly compressed, and the compression is entirely or substantially absorbed by the second layer 210, thus maintaining an equal or approximately equal effective capacitive sensing gap in all of the installation environments, and providing uniformity (or substantial uniformity) of operation of the sensor 200 in all of the installation environments. The variation in thickness of the second layer 210 (i.e., the layer of conductive material) will often have a negligible impact on how the different embodiments of the sensor 200 operate.

In some embodiments, the first layer 208 may compress to a greater degree during compression and installation of the sensor 200. However, this need not be the case.

Figure 3:
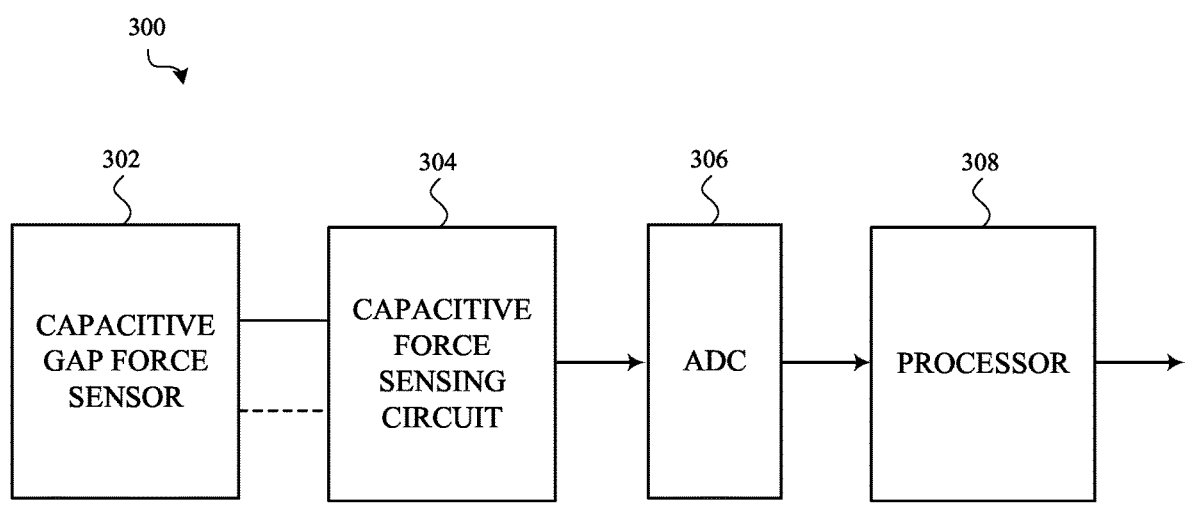
FIG. 3 shows an electrical block diagram of a capacitive gap force sensor and circuitry for sensing a capacitance of the sensor and generating an indication of a force presence of an amount of force.

FIG. 3 shows an electrical block diagram 300 of a capacitive gap force sensor 302 and circuitry for sensing a capacitance of the sensor 302 and generating an indication of a force presence or an amount of force. In some embodiments, the sensor 302 may be the sensor described with reference to FIGS. 2A-2C. The circuitry may include a capacitive force sensing circuit 304, which in some cases may include one or more amplifiers or filters. The capacitive force sensing circuit 304 may operate in an analog domain. An ADC 306 may receive an output of the capacitive force sensing circuit 304 and convert it to a digital domain. A processor 308 may receive an output of the ADC 306 directly, or may retrieve an output of the ADC 306 from a memory, and may translate the output of the ADC 306 from a raw value to an amount of force applied to the sensor 302. In some cases, the processor 308 may index a lookup table using the output of the ADC 306 or apply a conversion function to the output of the ADC 306.

Figure 4:
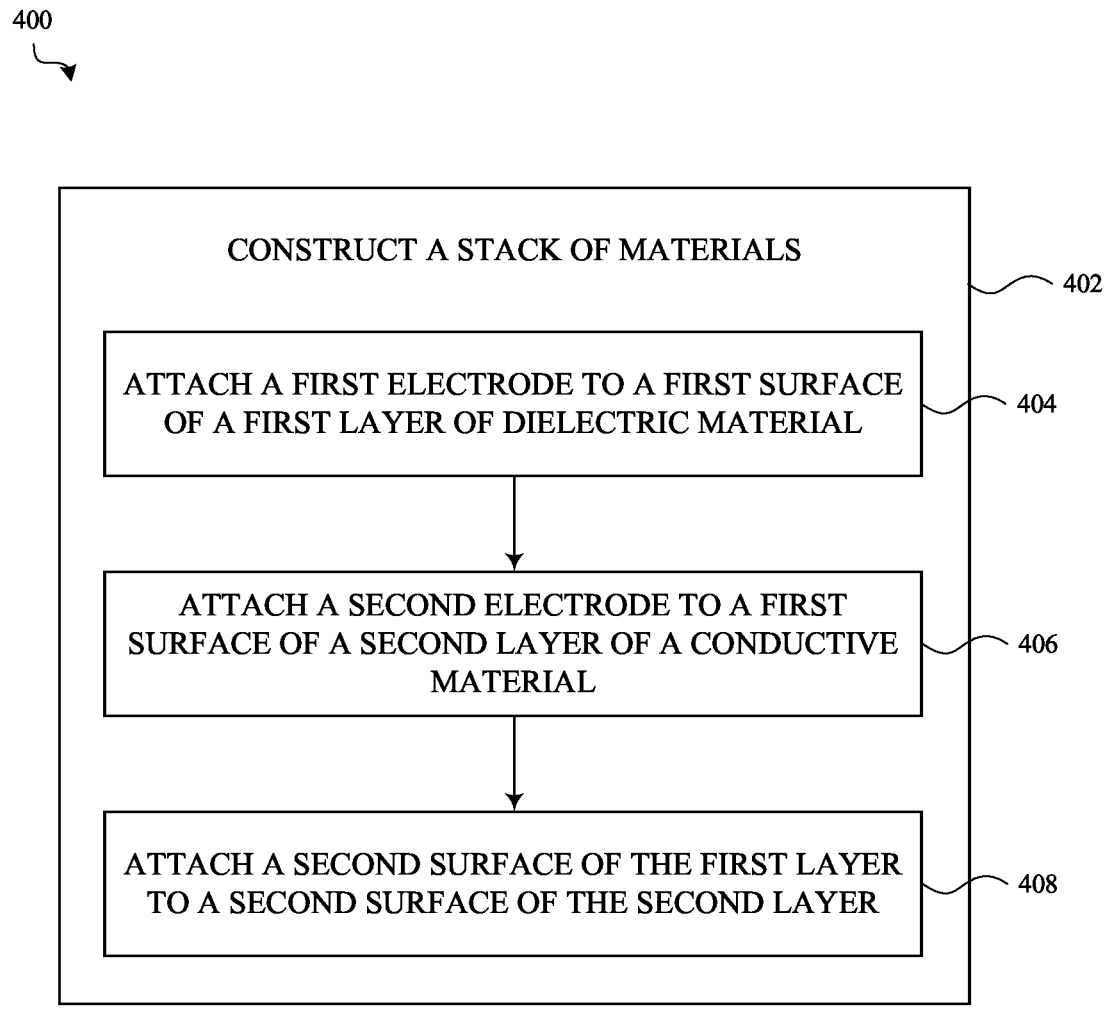
FIG. 4 shows a first example method of constructing a capacitive gap force sensor.

FIG. 4 shows a first example method 400 of constructing a capacitive gap force sensor. In some embodiments, the capacitive gap force sensor may be the sensor described with reference to FIGS. 2A-2C.

At block 402, the method 400 may include constructing a stack of materials. Constructing the stack of materials may include attaching a first electrode to a first surface of a first layer of dielectric material (at block 404); attaching a second electrode to a first surface of a second layer of conductive material (at block 406); and attaching a second surface of the first layer to a second surface of the second layer (at block 408). The second surface of the first layer may be opposite the first surface of the first layer, and the second surface of the second layer may be opposite the first surface of the second layer. The stack of materials may define an effective capacitive sensing gap between the first electrode and the second layer of conductive material.

Figure 5:
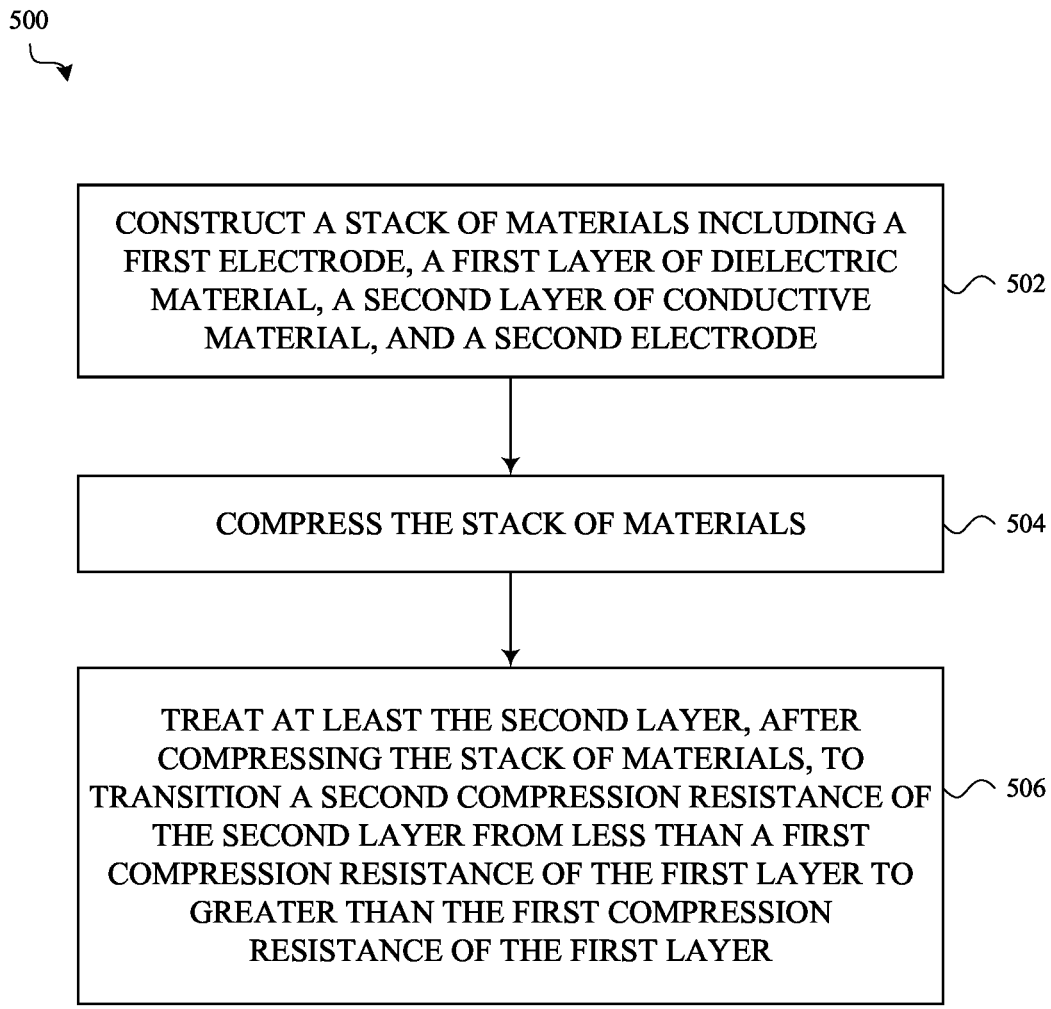
FIG. 5 shows a second example method of constructing a capacitive gap force sensor.

FIG. 5 shows a second example method 500 of constructing a capacitive gap force sensor. In some embodiments, the capacitive gap force sensor may be the sensor described with reference to FIGS. 2A-2C.

At block 502, the method 500 may include constructing a stack of materials. The stack of materials may include a first electrode, a first layer of dielectric material, a second layer of conductive material, and a second electrode, and may be constructed as described with reference to any of FIGS. 2A-2C and 4. After constructing the stack of materials, the first layer may have a first compression resistance that is greater than a second compression resistance of the second layer (e.g., the layer of conductive material may be softer than the layer of dielectric material).

At block 504, the method 500 may include compressing the stack of materials.

At block 506, the method 500 may include structurally modifying the second layer of the stack of materials. Structurally modifying the second layer may transition the second compression resistance to a compression resistance greater than the first compression resistance (e.g., the second layer of conductive material may be made harder than the first layer of dielectric material). The structurally modification may include one or more treatments of the second layer, as described below.

In some embodiments, structurally modifying the second layer may include heating the second layer. In some embodiments, structurally modifying the second layer may include exposing the second layer to a predetermined wavelength or wavelengths of light. In some embodiments, structurally modifying the second layer may include exposing the second layer to oxygen or, conversely, removing oxygen from the second layer's environment. In some embodiments, structurally modifying the second layer may include chemically treating the second layer or otherwise initiating a chemical reaction in the second layer. In some embodiments, structurally modifying the second layer may include increasing an extent of crosslinking of a polymer or polymer foam. In embodiments in which the second layer includes a foam that includes metal or other conductive particles embedded in a polymer matrix, such as a porous first polymer having a conductive second polymer embedded in its pores, structurally modifying the second layer may include hardening the first polymer and/or the second polymer.

In some embodiments, the method 500 may include positioning the stack of materials within an electronic device. In these embodiments, the compressing performed at block 504 may occur at least partially before the positioning, at least partially during the positioning, and/or at least partially after the positioning. In some embodiments, the structural modification may include partially curing the second layer before the stack of materials is positioned within an electronic device, and completing the cure after positioning the stack of materials within the electronic device.

The first layer may or may not be structurally modified as the second layer is structurally modified.

Figure 6:
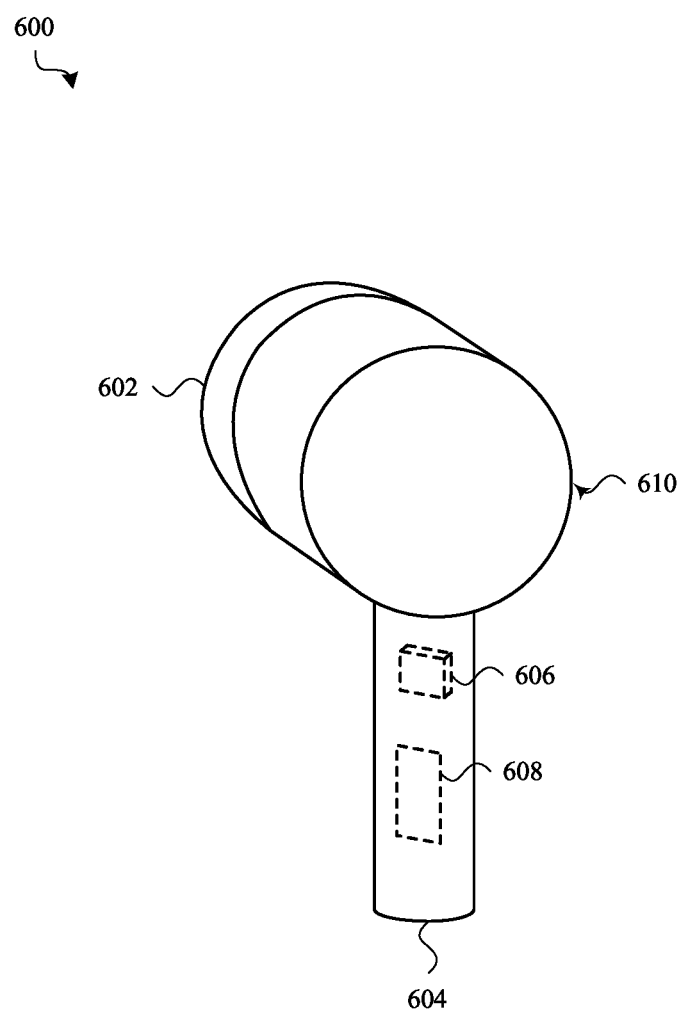
FIG. 6 shows an example of an earbud having a capacitive gap force sensor.
Figure 7:
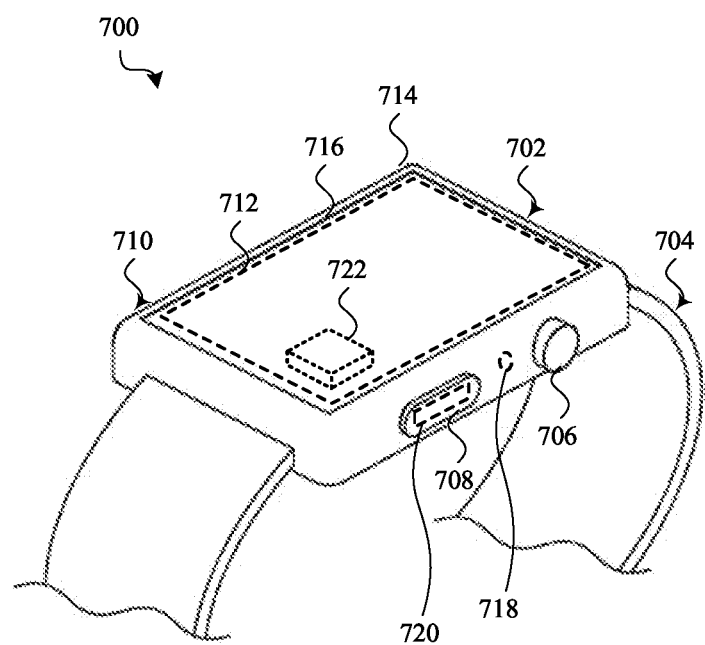
FIG. 7 shows an example of an electronic device that includes a capacitive gap force sensor.
Figure 8:
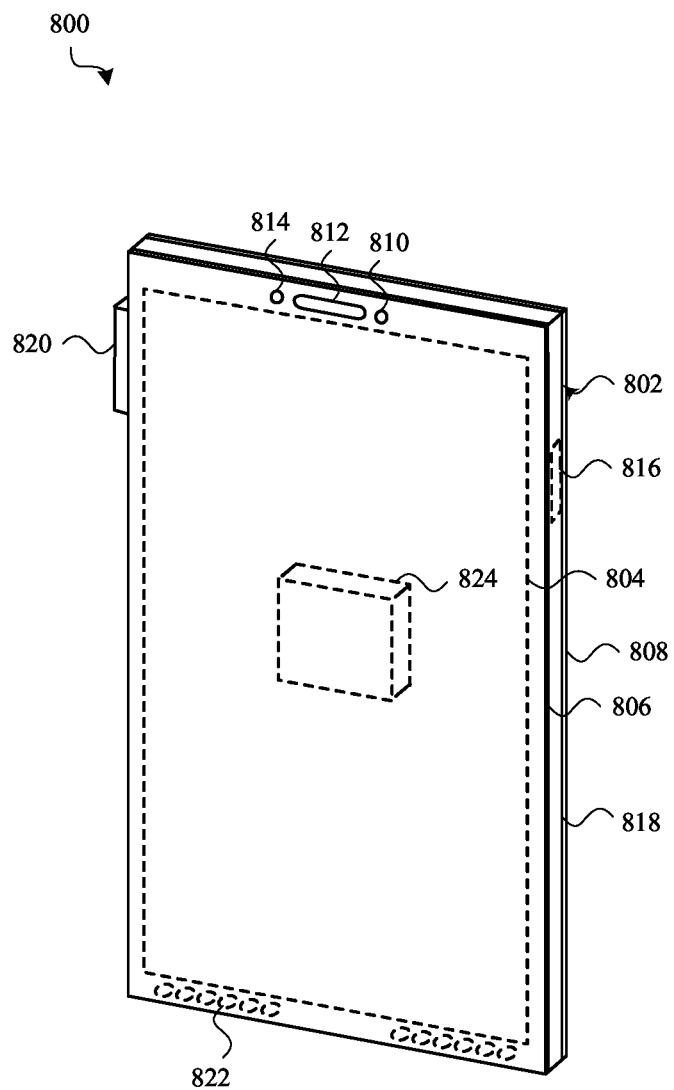
FIG. 8 shows another example of an electronic device that includes a capacitive gap force sensor.

FIGS. 6-8 show various example electronic devices in which one or more capacitive gap force sensors, such as the sensor described with FIGS. 2A-2C, may be incorporated.

FIG. 6 shows an example of an earbud 600 (an electronic device) that includes a capacitive gap force sensor 608. The earbud 600 may include a housing 610 (i.e., an earbud housing). The housing 610 may hold a speaker 602 that can be inserted into a user's ear, an optional microphone 604, and circuitry 606 that can be used to acquire audio from the microphone 604 (if provided), transmit audio to the speaker 602, and communicate audio between the speaker 602, the microphone 604, and one or more remote devices. The circuitry 606 may communicate with a remote device wirelessly (e.g., via a wireless communications interface, using a Wi-Fi, BLUETOOTH®, or cellular radio communications protocol, for example) or via one or more wires (e.g., via a wired communications interface, such as a Universal Serial Bus (USB) communications interface). In addition to communicating audio, the circuitry 606 may transmit or receive instructions and so on.

The capacitive gap force sensor 608 may be used, for example, to receive a force input (e.g., a button press) from a user. In some cases, the capacitive gap force sensor 608 may be positioned near or against an interior surface of the housing 610, under a force input surface on an exterior of the housing 610. The sensor 608 may have a stack of materials including a first electrode, a first layer of dielectric material, a second layer of conductive material, and a second electrode, as described with reference to FIGS. 2A-2C, 4, and 5. In these latter cases, the first electrode or the second electrode may be positioned near or against an interior surface of the housing 610, or the first and second electrodes may be positioned between opposing first and second force input surfaces on the exterior of the housing 610.

In some embodiments, the housing 610 may be formed of acrylonitrile butadiene styrene (ABS). In these and other embodiments, a stiffness of the first electrode and first layer of the sensor 608 may be much less than a stiffness of the housing 610, such as an order of magnitude or more less stiff. This may enable relatively small amounts of force on the force input surface to be registered by the sensor 608.

The circuitry 606 may include a processor and/or other components that are configured to determine an amount of force, or identify the presence of a force, received on the force input surface. In some cases, the circuitry 606 may include the components described with reference to FIG. 3 and the processor may be the processor described with reference to FIG. 3. In some embodiments, the circuitry 606 may adjust a volume of the speaker 602 in response to a received amount of force. In some embodiments, the earbud 600 may have a pair of capacitive gap force sensors, and one of the sensors may be used to turn the volume of the speaker 602 up, and the other may be used to turn the volume of the speaker 602 down. The circuitry 606 may also maintain or alter one or more other settings, functions, or aspects of the earbud 600.

FIG. 7 shows an example of a device 700 (an electronic device). The device 700 may include a body 702 (e.g., a watch body) and a band 704. The body 702 may include an input or selection device, such as a crown 706 or a button 708 that are attached to a housing 710 of the body 702. The band 704 may be attached to the housing 710 and may be used to attach the body 702 to a body part (e.g., an arm, wrist, leg, ankle, or waist) of a user. The body 702 may include a housing 710 that at least partially surrounds a display 712. In some embodiments, the housing 710 may include a sidewall 714, which sidewall 714 may support a front cover 716. The front cover 716 may be positioned over the display 712 and may provide a window through which the display 712 can be viewed. In some embodiments, the display 712 may be attached to (or abut) the sidewall 714 and/or the front cover 716. In alternative embodiments of the device 700, the display 712 may not be included and/or the housing 710 may have an alternative configuration.

The display 712 may include one or more light-emitting elements including, for example, light-emitting elements that define a light-emitting diode (LED) display, organic LED (OLED) display, liquid crystal display (LCD), electroluminescent (EL) display, or other type of display. In some embodiments, the display 712 may include, or be associated with, one or more touch and/or force sensors that are configured to detect a touch and/or a force applied to a surface of the front cover 716.

In some embodiments, the sidewall 714 of the housing 710 may be formed using one or more metals (e.g., aluminum or stainless steel), polymers (e.g., plastics), ceramics, or composites (e.g., carbon fiber). The front cover 716 may be formed, for example, using one or more of glass, a crystal (e.g., sapphire), or a transparent polymer (e.g., plastic) that enables a user to view the display 712 through the front cover 716. In some cases, a portion of the front cover 716 (e.g., a perimeter portion of the front cover 716) may be coated with an opaque ink to obscure components included within the housing 710. In some cases, all of the exterior components of the housing 710 may be formed from a transparent material, and components within the device 700 may or may not be obscured by an opaque ink or opaque structure within the housing 710.

The front cover 716 or a back cover (not shown) may be mounted to the sidewall 714 using fasteners, adhesives, seals, gaskets, or other components.

A display stack or device stack (hereafter referred to as a "stack") including the display 712 may be attached (or abutted) to an interior surface of the front cover 716 and extend into an interior volume of the device 700. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 716 (e.g., to a display surface of the device 700).

In some cases, a force sensor (or part of a force sensor system) may be positioned within the interior volume below and/or to the side of the display 712 (and in some cases within the device stack). In some cases, the force sensor may include one or more of the capacitive gap force sensors described with reference to FIGS. 2A-2C, 4, and 5. The force sensor (or force sensor system) may be triggered in response to the touch sensor detecting one or more touches on the front cover 716 (or a location or locations of one or more touches on the front cover 716), and may determine an amount of force associated with each touch, or an amount of force associated with the collection of touches as a whole. The force sensor (or force sensor system) may alternatively trigger operation of the touch sensor (or touch sensor system), or may be used independently of the touch sensor (or touch sensor system).

The device 700 may include various sensors. In some embodiments, the device 700 may have a port 718 (or set of ports) on a side of the housing 710 (or elsewhere), and an ambient pressure sensor, ambient temperature sensor, internal/external differential pressure sensor, gas sensor, particulate matter concentration sensor, or air quality sensor may be positioned in or near the port(s) 718.

In some embodiments, the device 700 may include a capacitive gap force sensor 720. The capacitive gap force sensor 720 may be constructed as described with reference to any of FIGS. 2A-2C, 4, and 5, and may be positioned to sense a force applied to the button 708 (i.e., with the button 708 providing a force input surface). The sensor 720, or an additional capacitive gap force sensor, may also or alternatively be positioned elsewhere on the device 700.

In some embodiments, the processor 722 may be configured to change a state of the device 700 in response to a press on the button 708, a press on the crown 706, or a rotation of the crown 706. For example, the processor 722 may change what is displayed on the display 712, adjust a volume of a local (internal to the device) or remote speaker, activate or deactivate a function or mode of the device 700, turn the device 700 on or off, and so on.

FIG. 8 shows another example of a device 800 (an electronic device) that includes a capacitive gap force sensor 816. The device's dimensions and form factor, including the ratio of the length of its long sides to the length of its short sides, suggest that the device 800 is a mobile phone (e.g., a smartphone). However, the device's dimensions and form factor are arbitrarily chosen, and the device 800 could alternatively be any portable electronic device including, for example a mobile phone, tablet computer, portable computer, portable music player, portable terminal, vehicle navigation system, robot navigation system, or other portable or mobile device. The device 800 could also be a device that is semi-permanently located (or installed) at a single location (e.g., a door lock, thermostat, refrigerator, or other appliance).

The device 800 may include a housing 802 that at least partially surrounds a display 804. The housing 802 may include or support a front cover 806 or a rear cover 808. The front cover 806 may be positioned over the display 804, and may provide a window through which the display 804 (including images displayed thereon) may be viewed by a user. In some embodiments, the display 804 may be attached to (or abut) the housing 802 and/or the front cover 806.

The display 804 may include one or more light-emitting elements or pixels, and in some cases may be an LED display, an OLED display, an LCD, an EL display, a laser projector, or another type of electronic display. In some embodiments, the display 804 may include, or be associated with, one or more touch and/or force sensors that are configured to detect a touch and/or a force applied to a surface of the front cover 806.

The various components of the housing 802 may be formed from the same or different materials. For example, a sidewall 818 of the housing 802 may be formed using one or more metals (e.g., stainless steel), polymers (e.g., plastics), ceramics, or composites (e.g., carbon fiber). In some cases, the sidewall 818 may be a multi-segment sidewall including a set of antennas. The antennas may form structural components of the sidewall 818. The antennas may be structurally coupled (to one another or to other components) and electrically isolated (from each other or from other components) by one or more non-conductive segments of the sidewall 818. The front cover 806 may be formed, for example, using one or more of glass, a crystal (e.g., sapphire), or a transparent polymer (e.g., plastic) that enables a user to view the display 804 through the front cover 806. In some cases, a portion of the front cover 806 (e.g., a perimeter portion of the front cover 806) may be coated with an opaque ink to obscure components included within the housing 802. The rear cover 808 may be formed using the same material(s) that are used to form the sidewall 818 or the front cover 806, or may be formed using a different material or materials. In some cases, the rear cover 808 may be part of a monolithic element that also forms the sidewall 818 (or in cases where the sidewall 818 is a multi-segment sidewall, those portions of the sidewall 818 that are non-conductive). In still other embodiments, all of the exterior components of the housing 802 may be formed from a transparent material, and components within the device 800 may or may not be obscured by an opaque ink or opaque structure within the housing 802.

The front cover 806 may be mounted to the sidewall 818 to cover an opening defined by the sidewall 818 (i.e., an opening into an interior volume in which various electronic components of the device 800, including the display 804, may be positioned). The front cover 806 may be mounted to the sidewall 818 using fasteners, adhesives, seals, gaskets, or other components.

A display stack or device stack (hereafter referred to as a "stack") including the display 804 (and in some cases the front cover 806) may be attached (or abutted) to an interior surface of the front cover 806 and extend into the interior volume of the device 800. In some cases, the stack may also include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 806 (e.g., to a display surface of the device 800).

In some cases, a force sensor (or part of a force sensor system) may be positioned within the interior volume below and/or to the side of the display 804 (and in some cases within the stack). In some cases, the force sensor may include one or more of the capacitive gap force sensors described with reference to FIGS. 2A-2C, 4, and 5. The force sensor (or force sensor system) may be triggered in response to the touch sensor detecting one or more touches on the front cover 806 (or indicating a location or locations of one or more touches on the front cover 806), and may determine an amount of force associated with each touch, or an amount of force associated with the collection of touches as a whole.

The device 800 may include various other components. For example, the front of the device 800 may include one or more front-facing cameras 810 (including one or more image sensors), speakers 812, microphones, or other components 814 (e.g., audio, imaging, and/or sensing components) that are configured to transmit or receive signals to/from the device 800. In some cases, a front-facing camera 810, alone or in combination with other sensors, may be configured to operate as a bio-authentication or facial recognition sensor.

The device 800 may also include buttons or other input devices positioned along the sidewall 818 and/or on a rear surface of the device 800. For example, a volume button or multipurpose button 820 may be positioned along the sidewall 818, and in some cases may extend through an aperture in the sidewall 818. In some cases, the button 820 may include one or more of the capacitive gap force sensors described with reference to FIGS. 2A-2C, 4, and 5, or a capacitive gap force sensor 816 may be positioned under a surface (i.e., a force input surface) of the housing 802 or sidewall 818. The sidewall 818 may in some cases include one or more ports 822 that allow air, but not liquids, to flow into and out of the device 800. In some embodiments, one or more sensors may be positioned in or near the port(s) 822. For example, an ambient pressure sensor, ambient temperature sensor, internal/external differential pressure sensor, gas sensor, particulate matter concentration sensor, or air quality sensor may be positioned in or near a port 822.

In some embodiments, the processor 824 may be configured to change a state of the device 800 in response to a press of the button 820 or a press on the capacitive gap force sensor 816. For example, the processor 824 may change what is displayed on the display 804, adjust a volume of a local (internal to the device) or remote speaker, activate or deactivate a function or mode of the device 800, turn the device 800 on or off, and so on.

Figure 9:
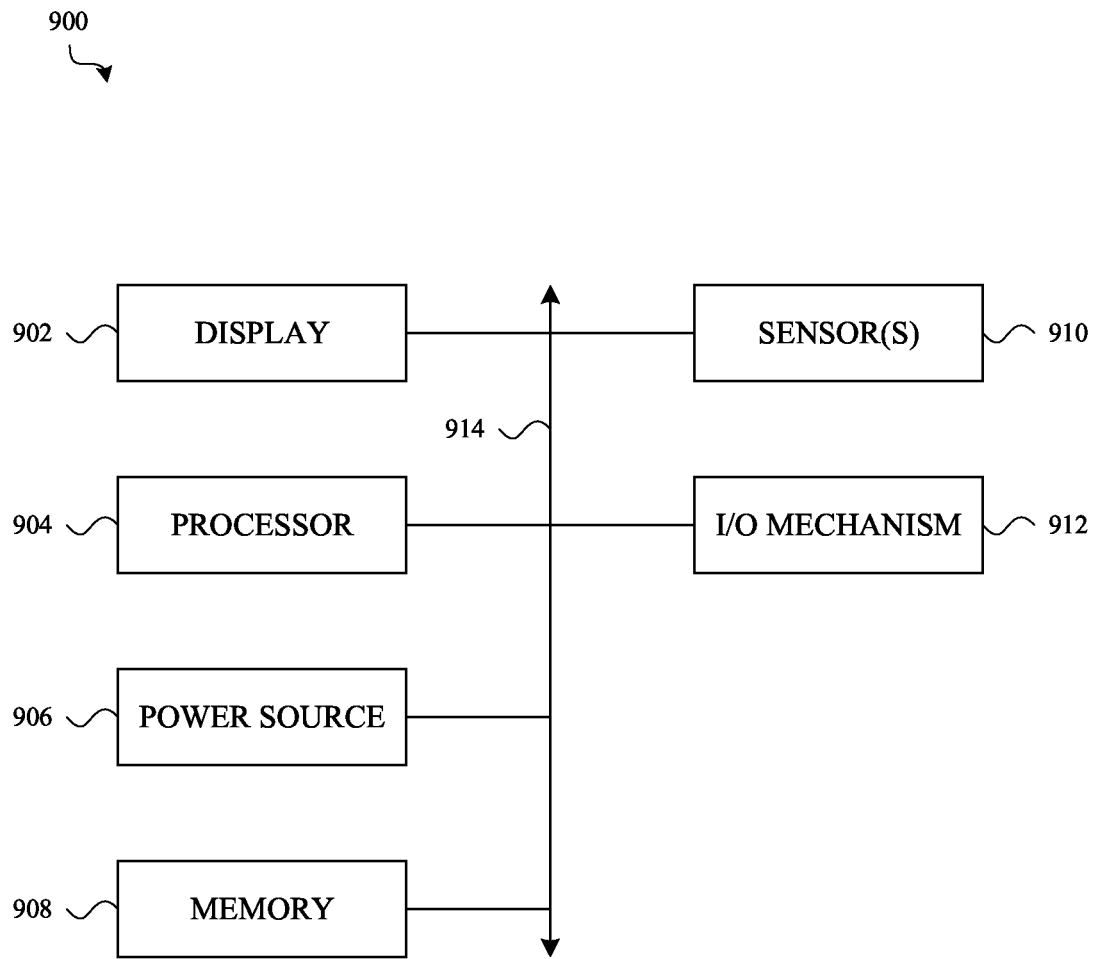
FIG. 9 shows a sample electrical block diagram of an electronic device.

FIG. 9 shows a sample electrical block diagram of an electronic device 900, which electronic device may in some cases be the device described with reference to one of FIGS. 6-8. The electronic device 900 may include an optional electronic display 902 (e.g., a light-emitting display), a processor 904, a power source 906, a memory 908 or storage device, a sensor system 910, or an input/output (I/O) mechanism 912 (e.g., an input/output device, input/output port, or haptic input/output interface). The processor 904 may control some or all of the operations of the electronic device 900. The processor 904 may communicate, either directly or indirectly, with some or all of the other components of the electronic device 900. For example, a system bus or other communication mechanism 914 can provide communication between the electronic display 902, the processor 904, the power source 906, the memory 908, the sensor system 910, and the I/O mechanism 912.

The processor 904 may be implemented as any electronic device capable of processing, receiving, or transmitting data or instructions, whether such data or instructions is in the form of software or firmware or otherwise encoded. For example, the processor 904 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 904 be the processor described with reference to FIG. 3.

It should be noted that the components of the electronic device 900 can be controlled by multiple processors. For example, select components of the electronic device 900 (e.g., the sensor system 910) may be controlled by a first processor and other components of the electronic device 900 (e.g., the electronic display 902) may be controlled by a second processor, where the first and second processors may or may not be in communication with each other.

The power source 906 can be implemented with any device capable of providing energy to the electronic device 900. For example, the power source 906 may include one or more batteries or rechargeable batteries, or one or more contacts or housings for contacting or supporting the battery (ies). Additionally or alternatively, the power source 906 may include a power connector or power cord that connects the electronic device 900 to another power source, such as a wall outlet.

The memory 908 may store electronic data that can be used by the electronic device 900. For example, the memory 908 may store electrical data or content such as, for example, audio and video files, documents and applications, device settings and user preferences, timing signals, control signals, and data structures (e.g., instructions) or databases. The memory 908 may include any type of memory. By way of example only, the memory 908 may include random access memory, read-only memory, Flash memory, removable memory, other types of storage elements, or combinations of such memory types.

The electronic device 900 may also include a sensor system 910, including sensors positioned almost anywhere on the electronic device 900. In some cases, the sensor system 910 may include one or more capacitive gap force sensors, positioned and/or configured as described with reference to any of FIGS. 2A-8. The sensor system 910 may be configured to sense one or more type of parameters, such as but not limited to, motion; relative motion; vibration; light; touch; force; heat; biometric data (e.g., biological parameters) of a user; air quality; proximity; position; connectedness; matter type; and so on. By way of example, the sensor system 910 may include one or more of (or multiple of) a heat sensor, a position sensor, a proximity sensor, a light or optical sensor (e.g., a light emitter and/or detector), an accelerometer, a pressure transducer, a gyroscope, a magnetometer, a health monitoring sensor, an air quality sensor, and so on. Additionally, the sensor system 910 may utilize any suitable sensing technology, including, but not limited to, interferometric, magnetic, pressure, capacitive, ultrasonic, resistive, optical, acoustic, piezoelectric, or thermal technologies.

The I/O mechanism 912 may transmit or receive data from a user or another electronic device. The I/O mechanism 912 may include the electronic display 902, a touch sensing input surface, a crown, one or more buttons (e.g., a graphical user interface "home" button), one or more cameras (including an under-display camera), one or more microphones or speakers, one or more ports, such as a microphone port, and/or a keyboard. Additionally or alternatively, the I/O mechanism 912 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:
1. An electronic device, comprising:
    a capacitive gap force sensor, comprising:
        a first electrode;
        a second electrode spaced apart from the first electrode;

a first layer of dielectric material positioned between the first electrode and the second electrode; and
a second layer of conductive material positioned between the first layer and the second electrode; and
a housing having a force input surface; wherein,
the first layer has a first compression resistance less than a second compression resistance of the second layer;
an effective capacitive sensing gap is defined between the first electrode and the second layer;
the capacitive gap force sensor is positioned near or against an interior surface of the housing, under the force input surface; and
the first layer is configured to compress or deform and alter the effective capacitive sensing gap when a force is received on the force input surface.

2. The electronic device of claim 1, wherein the first layer and the second layer are part of a multi-layer fill that spans an entirety of a space between the first electrode and the second electrode.

3. The electronic device of claim 1, wherein the first layer comprises a polymer foam.

4. The electronic device of claim 1, wherein each of the first layer and the second layer comprises a polymer foam.

5. The electronic device of claim 1, wherein the housing comprises acrylonitrile butadiene styrene (ABS).

6. The electronic device of claim 5, wherein a first stiffness of the first electrode and a second stiffness of the first layer are at least an order of magnitude less stiff than a third stiffness of the force input surface.

7. The electronic device of claim 1, wherein the capacitive gap force sensor defines an air gap between one of:
the first electrode and the first layer; or
the first layer and the second layer.

8. The electronic device of claim 1, further comprising:
a capacitive force sensing circuit coupled to at least one of the first electrode or the second electrode.

9. A capacitive gap force sensor, comprising:
a first electrode;
a second electrode spaced apart from the first electrode;
a first layer of dielectric material positioned between the first electrode and the second electrode; and
a second layer of conductive material positioned between the first layer and the second electrode; wherein,
the first layer has a first compression resistance less than a second compression resistance of the second layer;
an effective capacitive sensing gap is defined between the first electrode and the second layer; and
the first layer is configured to compress or deform and alter the effective capacitive sensing gap when a force is received at the first electrode or the second electrode.

10. The capacitive gap force sensor of claim 9, wherein each of the first layer and the second layer comprises a hydrophobic material.

11. The capacitive gap force sensor of claim 9, wherein each of the first layer and the second layer comprises a closed cell foam.

12. The capacitive gap force sensor of claim 9, wherein the second layer comprises an open cell foam.

13. The capacitive gap force sensor of claim 9, further comprising:
an adhesive attaching the first layer to the second layer.

14. The capacitive gap force sensor of claim 9, wherein the second layer comprises a polymer foam at least partially coated with a metal.

15. A method of constructing a capacitive gap force sensor, comprising:
constructing a stack of materials, the constructing including,
attaching a first electrode to a first surface of a first layer of dielectric material;
attaching a second electrode to a first surface of a second layer of conductive material; and
attaching a second surface of the first layer to a second surface of the second layer;
compressing the stack of materials; and
structurally modifying the second layer, after compressing the stack of materials; wherein,
the second surface of the first layer is opposite the first surface of the first layer;
the second surface of the second layer is opposite the first surface of the second layer; and
the stack of materials defines an effective capacitive sensing gap between the first electrode and the second layer of conductive material;
after constructing the stack of materials, the first layer has a first compression resistance greater than a second compression resistance of the second layer; and
the structural modification of the second layer transitions the second compression resistance to a compression resistance greater than the first compression resistance.

16. The method of claim 15, wherein structurally modifying the second layer comprises:
heating the second layer.

17. The method of claim 15, wherein structurally modifying the second layer comprises:
exposing the second layer to a predetermined wavelength or wavelengths of light.

18. The method of claim 15, wherein structurally modifying the second layer comprises:
exposing the second layer to oxygen or removing oxygen from an environment of the second layer.

19. The method of claim 15, wherein structurally modifying the second layer comprises:
chemically treating the second layer.

20. The method of claim 15 further comprising:
positioning the stack of materials within an electronic device; wherein,
the compressing occurs at least partially during the positioning.

21. The method of claim 15, further comprising:
positioning the stack of materials within an electronic device; wherein,
the compressing occurs at least partially after the positioning.

* * * * *